3,553,773
SPINNERET ASSEMBLY
James W. Ij. Heijnis, Roemer Visscherstaat 51,
Arnhem, Netherlands
Filed Feb. 21, 1968, Ser. No. 707,173
Claims priority, application Netherlands, Mar. 9, 1967,
6703657
Int. Cl. D01d 1/06
U.S. Cl. 18—8                                   2 Claims

ABSTRACT OF THE DISCLOSURE

Plural channel means in a spinneret assembly cover, lid, and the like for evenly distributing molten polymer therein in order to achieve even hydraulic pressure distribution for improving sealing.

---

This invention relates to apparatus for spinning manmade or synthetic filaments, threads and yarns. More specifically, the invention relates to an improved self-sealing spinneret assembly for spinning filaments, threads or yarns from highly viscous thermoplastic materials.

In the manufacture of synthetic filaments from highly viscous, high molecular weight polymeric materials such as macromolecular polyamides, polyesters, and the like, the material is usually fed in melt form to a spinneret assembly or "pack" at very high pressures and temperatures. And, according to conventional practices, it is necessary that the assembly not only have a means for forming filaments, such as a perforated shape-imparting spinneret plate, but also have means for preventing foreign matter, incompletely fused polymer, pigment aggregations, aggregates of delustering material, catalysts, and the like from reaching the spinneret plate. Spinneret assemblies of more recent design also have means to effect an improved self-sealing characteristic when subjected to polymer hydraulic pressure and usually comprise a cylindrical housing supporting and confining an inlet piece (usually a unitary fill plug and the like). Thus, spinneret assemblies of relatively recent vintage at least have a series of filters and a spinneret plate and many also include other auxiliaries such as means for evenly distributing the polymer along the topmost surface of the spinneret plate. With those also having a hydraulic sealing capacity, the polymer is in most cases fed to the interior of the assembly through its cylindrical housing and, as shown in U.S. Pat. No. 3,353,211, then through a channel or flow conduit machined into the inlet piece contained therein. A second larger closable opening is usually provided at the top of the assembly or "pack" to afford access to the various necessary components previously mentioned.

According to the above-mentioned commonly assigned patent, the main polymer distribution channel is also located in the inlet piece and the channel gradually narrows and extends along the major portion of the housing's inner cylindrical wall. While this construction affords the industry major advantages in regard to improved heat distribution to polymer melt passing through the assembly, disadvantages have been noted where either a sand filter media or relatively thin, fragile filter screens are used in lieu of relatively thick, heavy perforated plates or heavy gauge screen filters wherein acceptable hydraulic pressure sealing of the assembly is still a necessary prerequisite for proper performance. In short, component damage and air entrainment have been found to be a problem where fragile, small gauge screens or sand are used as the primary filtering media and are believed to be caused by the fact that the known design of the initial polymer distribution channel leading to and connecting with the polymer supply conduit does not afford an even distribution of self-sealing hydraulic pressure to the pack's topmost cover, spinneret plate and the associated individual component sealing rings therefor.

Accordingly, it is an object of this invention to provide an improved spinneret assembly or spinneret "pack" which avoids these above-mentioned disadvantages.

Another object is to provide an improved spinneret assembly wherein either sand or thin gauze filter screens can be used as the filtering media.

Still another object of the invention is to provide a spinneret assembly having improvements in means affording distribution of hydraulic pressure therein.

In general, the invention consists in an improved modification of the main polymer distribution channel and the cover for the assembly. The channel extends in a horizontal plane along not more than approximately half the outer circumference of the assembly housing, and in the bottom face of the cover there is provided a number of auxiliary distribution channels extending from the main distribution channel running across the bottom face of the cover. Such construction according to the invention surprisingly has been found very suitable in melt spinning wherein sand is used above a polymer distribution plate as the filter media. Further, such apparatus is considered particularly suitable when relatively thin gauge or screen filters and the like are preferred in lieu of, or even in combination with, sand. As will be appreciated by those skilled in the art, the ability to use thin gauge filter screens permits simple, compact assembly construction.

Ideally, a main distribution channel should lead directly into plural auxiliary distribution channels, thus forming a polymer distribution header or its equivalent. The cross-sectional areas of the plurality of channels or the width thereof should gradually decrease until a value of, say, zero is reached. In such case, these plural auxiliary distribution channels would, for example, then extend from the one main distribution channel close to the opposite edge or rim portion of the assembly's cover or lid. Uniform distribution of the polymer is obtained over the entire distribution plate and, thence, to the spinneret plate. The risk of undesirable air inclusions during spinning-in is minimized.

The apparatus according to the invention may in a simple manner be constructed so that the auxiliary channels extend in parallel relationship over the bottom face of the cover. They preferably should be of inverted U or of trough-like shape in cross section with their open ends facing downward and coinciding with the bottom face of the cover.

The foregoing will become more apparent to those skilled in the art upon study of the following description, taken in conjunction with the accompanying drawings, wherein.

Figure 1:
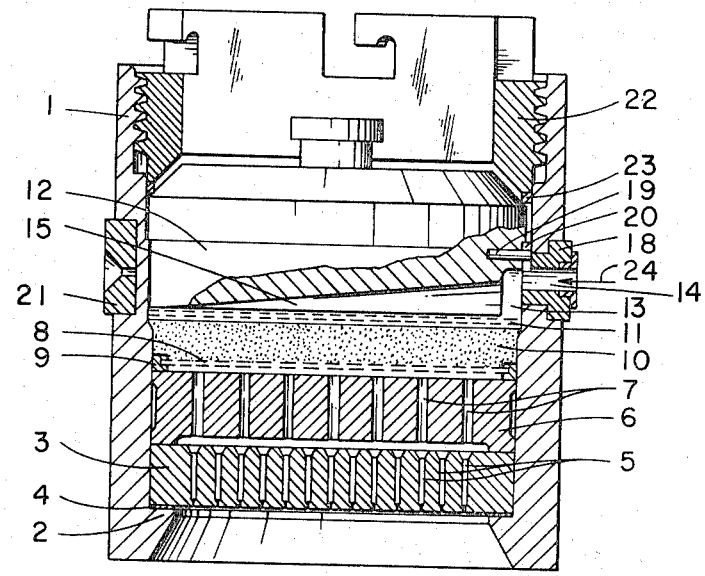
FIG. 1 shows, in longitudinal section, the complete melt spinning assembly of the present invention.

The melt spinning assembly shown in FIG. 1 comprises a cylindrical housing, which is heated in a known manner (not shown). Provided at the bottom end of housing 1 is flange 2 on which rests spinneret plate 3. Packing ring 4 is provided between the flange and the spinneret plate. Spinneret plate 3 is in a known manner provided with a large number of orifices 5 which are arranged in any preferred pattern. On the spinneret plate rests distribution plate 6 which is provided with a larger number of vertical distribution channels 7. On distribution plate 6 is a filter gauze pack 8 which is made up of coarse-meshed and fine-meshed gauzes and is mounted in U-shaped ring 9. Above filter gauze pack 8 is sand pack 10 at the top of which there may be provided a second thin filter gauze pack 11. Housing 1 is closed by cover 12 at its top.

Figure 2:
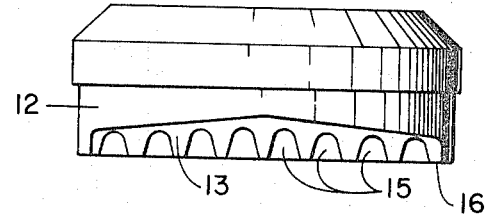
FIG. 2 shows a side view of the assembly cover.
Figure 3:
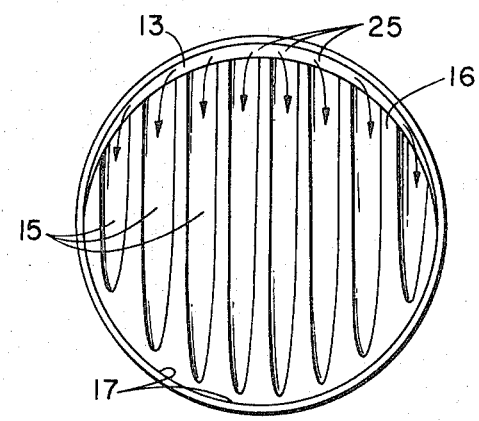
FIG. 3 illustrates an inverted planar view of the cover of FIG. 2.

Provided in cover 12 is a main distribution channel 13 which extends along an arc smaller than 180° (see FIG. 3). The main channel 13 gradually narrows from the point where polymer inlet 14 opens into it. From main channel 13 a number of parallel inverted U-shaped auxiliary distribution channels 15 extend over bottom face 16 of cover 12. Starting from main channel 13, the width of the auxiliary channels 15 gradually decreases to zero near the rim portion 17 opposite main channel or header 13. As is apparent from FIG. 2, the open ends of auxiliary channels 15 are inverted, or in fact, face downwardly. Mounted in housing 1 at inlet 14 is sleeve 18.

Also provided in cover 12 is dowel 19 which fits in a groove 20 of housing 1 and sleeve 18. When in this manner, it is insured that cover 12 is placed relative to the housing in a correct angular position. Therefore, inlet 14 will open into main channel 13 at a point where said channel has its largest cross-sectional area. In the outer wall of housing 1, at a point directly opposite sleeve 18, there is provided gland 21 to which, in a known manner, with the aid of a bolt (not shown), mechanical pressure may be applied sufficient to obtain a tight joint between sleeve 18 and a polymer feed conduit (not shown) positioned outside housing 1. Above cover 12 housing 1 carries a screwed-in locking ring 22. Between cover 12 and locking ring 22, there is provided sealing ring 23 which is compressed when the cover is forced upwards under the influence of hydraulic (polymer) pressure. Cover 12 and the lock ring or lock screw 22 carry means for removing them from housing 1 in a periodic interruption of the spinning process.

Molten polymer flows under high pressure into housing 1 (in the direction of arrow 24) through inlet 14 and is subsequently spread, via the main distribution channel 13, along the inner side of the rim of cover 12. From main channel 13 the polymer flows (in the direction of arrows 25) into auxiliary channels 15 and is uniformly distributed over the entire filter area. After passing through filters 11, 10, and 8, the polymer flows through distribution channels 7 provided in the distribution plate and is subsequently forced through orifices 5 in spinneret plate 3 in order to be spun into a yarn.

It is understood that many widely different embodiments of this invention may be made without departing from the spirit and scope thereof. It is not intended to be limited in any manner except as indicated in the appended claims.

I claim:

1. An improved spinneret assembly comprising, in combination:
   (a) a housing having at least one inlet for the pressure feeding of polymer melt into a main distribution channel,
   (b) a cover for said assembly, the lower outer edge of said cover partially forming said main distribution channel along at least part of the inner circumference of said housing,
   (c) said cover having a plurality of side-by-side auxiliary distribution channels positioned in the bottom face of said cover and communicating with said main channel,
   (d) said auxiliary channels decreasing gradually in width along their length, the larger width segments thereof connecting to said main channel,
   (e) the main polymer distribution channel on both sides of said polymer inlet gradually narrowing in the direction of polymer flow,
   (f) filter means, distribution and spinning plate means being sequentially contained in said housing under the bottom face of said cover, said assembly being sealed by improved polymer hydraulic pressure.

2. Apparatus as defined in claim 1 wherein said auxiliary channels are parallel in relationship to each other.

References Cited

UNITED STATES PATENTS

| | | | |
|---|---|---|---|
| 2,931,091 | 4/1960 | Breen | 18—8X |
| 3,225,383 | 12/1965 | Cobb | 18—8 |
| 3,299,470 | 1/1967 | Stockbridge | 18—8 |
| 3,350,741 | 11/1967 | Yoshida et al. | 18—8 |
| 3,353,211 | 11/1967 | Heijnis | 18—8 |

J. SPENCER OVERHOLSER, Primary Examiner

M. O. SUTTON, Assistant Examiner

UNITED STATES PATENT OFFICE
CERTIFICATE OF CORRECTION

Patent No. 3,553,773      Dated January 12, 1971

Inventor(s) James W. Ij. Heijnis

It is certified that error appears in the above-identified patent and that said Letters Patent are hereby corrected as shown below:

In the heading to the printed specification, after line insert -- assignor to American Enka Corporation, Enka, N. C. a corporation of Delaware --.

Signed and sealed this 1st day of June 1971.

(SEAL)
Attest:

EDWARD M. FLETCHER, JR.
Attesting Officer

WILLIAM E. SCHUYLER, J
Commissioner of Patent